No. 857,742. PATENTED JUNE 25, 1907.
A. LANQUIST.
MEASURING AND MIXING MACHINE.
APPLICATION FILED OCT. 12, 1905.
2 SHEETS—SHEET 1.
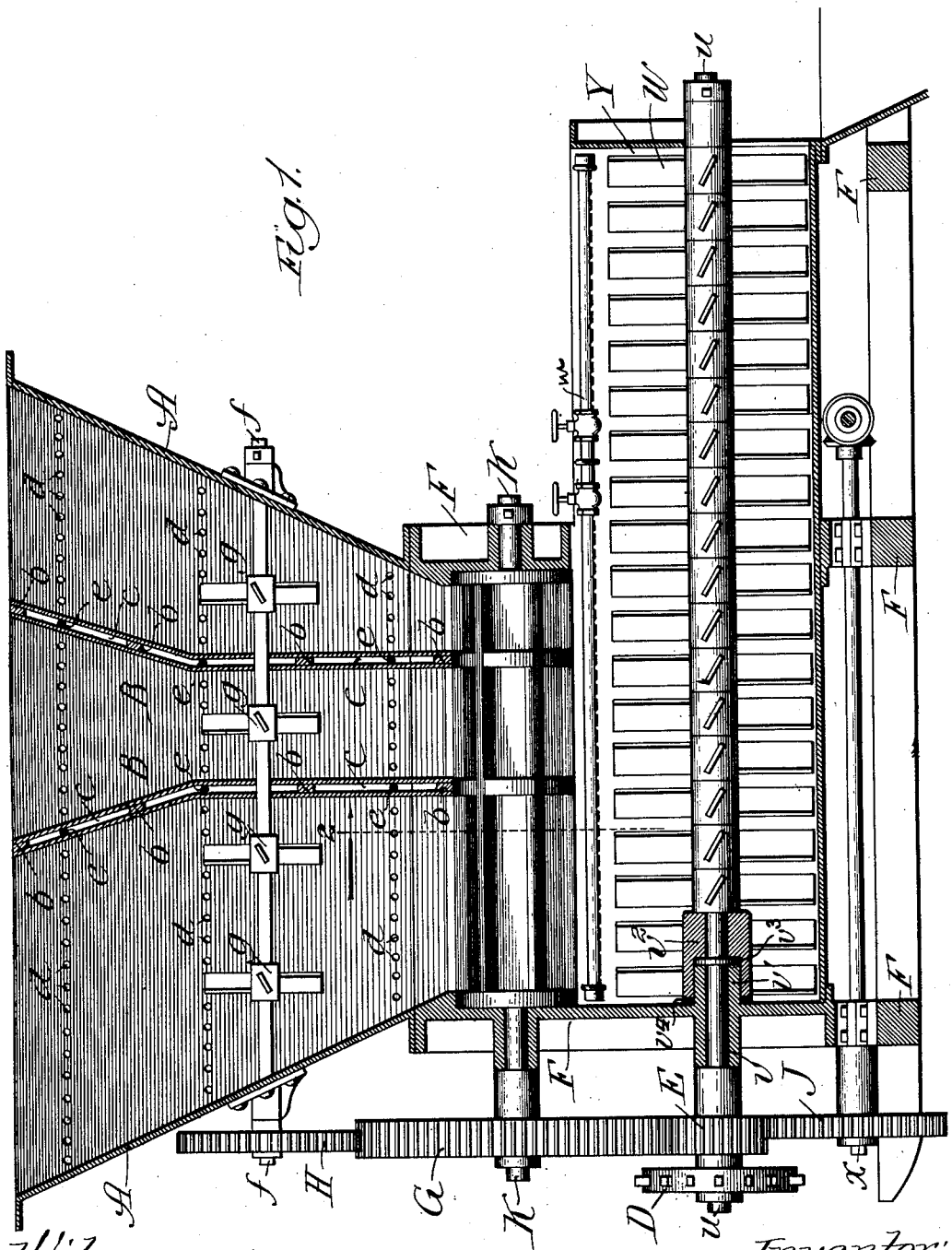
Witnesses:
Inventor:
Andrew Lanquist
By Robert Catherwood
Atty

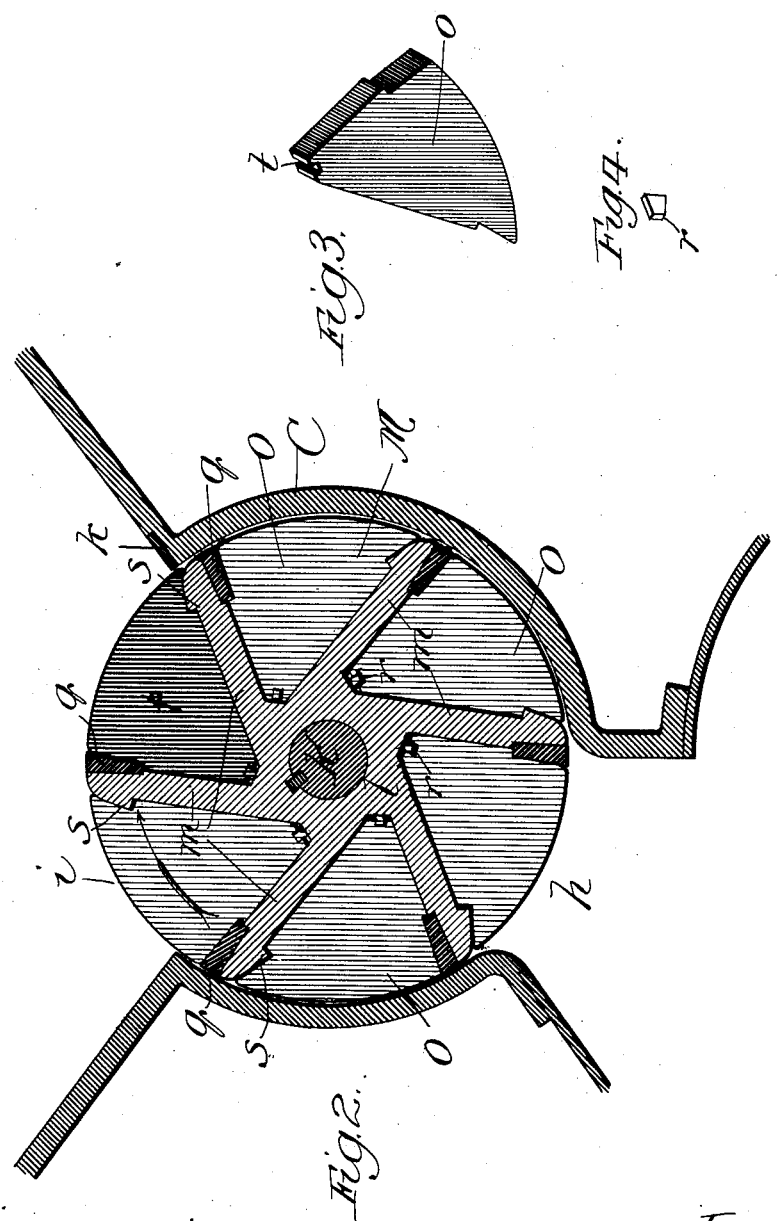

UNITED STATES PATENT OFFICE.

ANDREW LANQUIST, OF CHICAGO, ILLINOIS.

MEASURING AND MIXING MACHINE.

No. 857,742.      Specification of Letters Patent.      Patented June 25, 1907.

Application filed October 12, 1905. Serial No. 282,516.

*To all whom it may concern:*

Be it known that I, ANDREW LANQUIST, a citizen of the United States, residing at the city of Chicago, in the county of Cook and State of Illinois, have invented certain new and useful Improvements in Measuring and Mixing Machines, of which the following is a specification.

My invention relates to apparatus for automatically proportioning and mixing the constituent materials of compounds, and is especially adapted for use in machines for automatically measuring and mixing in the proper proportions the ingredients of concrete, mortar and analogous compositions for use in construction work.

The object of my invention is to provide a machine which may be adjusted or set to measure the constituent materials of compositions in the desired relative proportions with the nicest accuracy and certainty.

The invention also contemplates a force feed arrangement to insure positive gathering in and complete filling or packing of the materials into the measuring compartments and means for avoiding the inaccuracies caused by the contents of one compartment slipping into adjacent compartments or into the mixing apparatus in advance of the discharge of the whole.

Further objects are to provide a construction which is not likely to break and need repair, and which has the strength requisite to crush the larger particles of constituent materials, and to provide simple facilities, easily understood by unskilled operatives, for prompt and accurate adjustment to vary the relative proportions of the ingredients and to render the machine durable, compact and economical in construction.

In the accompanying drawings, wherein like letters indicate like parts throughout the several figures, I have shown a machine embodying my invention in one of its preferred forms.

Figure 1 is a view, partly in side elevation and partly in cross section, the outer walls of the machine and the bearings of the combined mixer and conveyer being removed to show the interior construction. Fig. 2 is a cross-section of the measuring-roll, showing all but one of a series of the movable transverse plates or partitions in place and a portion of the walls of the hopper and cylindrical casing of the roll in cross-section. Fig. 3 is a view in perspective of one of the transverse movable partitions or plates of the measuring-roll pockets. Fig. 4 is a side view of one of the removable taper locks of wedge keys $r$.

My device is advantageously used in connection with gravity, but may be employed in other positions without departing from the principles of the invention. The words "upper" and "top" refer herein to the feed or hopper portions of the machine and the words "lower" and "bottom" to the discharge.

A indicates a hopper or container divided into compartments to correspond with and set directly above and in line with the movable partitions or plates $o$ in the measuring roll below each adapted to contain one of the materials to be mixed, supported on frame F and having one or more adjustably movable transverse partitions B for dividing it into compartments and affording capacity for varying their relative size. It is desirable in constructing this hopper and the partitions to avoid projections upon which the constituent materials contained in the compartments may lodge or stick. I prefer, therefore, to incline the hopper walls from top to bottom and to construct the partitions B each of two plates or pieces of sheet-iron, or other suitable material, fastened together at the points $b$ in any convenient manner, with intervening spaces $c$, left between the plates and adjacent points of fastening, and having a plurality of lines of small rod holes $d$, cut in the walls of the hopper at right angles to the partitions and in alinement with these spaces, through which removable rods, $e$, may be passed to secure the partitions to the hopper walls. By inserting partitions B across the hopper and adjusting the spaces $c$ to register with oppositely disposed rod holes $d$ and thrusting the rods $e$ through them, the partitions are adjustably secured so that the relative capacity of the compartments may be varied at will by resetting the partitions. To facilitate feeding I prefer to bend the partitions B, as shown in Fig. 1.

It may be found desirable to provide mechanism for stirring or agitating the materials in the hopper, A, to prevent congestion or sticking, and to accelerate feeding. This may be done conveniently by mounting on the shaft $f$, which extends from end to end of the hopper, journaled on the end walls thereof, suitable agitators, $g$, and providing means for rotating them.

Below the hopper, and inclosed within the machine by the cylindrical casing C, is the measuring-roll M, adapted to rotate in the direction of the arrow shown in Fig. 2. This roll is keyed or otherwise secured to shaft K, extending longitudinally below the bottom of the hopper compartments and journaled in the frame F of the machine. Measuring-roll, M, consists of a longitudinal core, $l$, of irregular shape, a plurality of shearing or crushing-arms, $m$, preferably cast integrally with the core, $l$, and extending the length of the roll to form divisional walls for pockets, $p$, between them, and transverse partitions, $o$, adapted to be removably fitted between the divisional walls to subdivide the pockets into compartments. Near the bottom of the hopper, on the side toward which the roll is turning, is a bar or bearing-face, $k$, preferably of chilled steel. On the forward outer edge of each divisional wall $m$ is a bar, $q$, preferably of chilled steel, inclined relative to the arm $m$ and to the forward movement of the same, the object of the bar $q$ and the bar $k$ on casing C being to afford hard crushing and shearing surfaces this accentuation of the eccentric mounting or inclination of the walls being adapted to crowd in the topmost material, crush intervening particles and shear or even off the excess material in each pocket. The outer forward front edge of this bar is preferably sharp or acute so as to provide a cutting edge.

The arrangement of the walls, $m$, upon the shaft is an important feature of this invention, since it is essential to accurate and certain operation of the machine that each pocket, as it is presented to the materials in the hopper, should be exactly filled, no more and no less, and that none of the material should trickle or fall unmeasured into the mixing apparatus. The different sizes of the particles to be dealt with in the mixing of such composites or compounds as concrete, where very fine dry cement is used in one compartment of the hopper and crushed stone in another, the latter consisting of pieces varying in size from one-sixteenth to three inches or more in diameter, makes the necessary accurate measurement an extremely difficult problem. It is a rule of construction well known to builders that a wall or foundation is no stronger than its weakest part, and it follows, therefore, that in the making of such compounds as concrete for construction work a single variation in proportions may render the entire structure weak, or even dangerous, and make useless all previous and future care and expense in measuring and mixing the ingredients. In the construction of the machine it is necessary to avoid breaking the walls of the measuring roll compartments by too great lateral strain, and it is, therefore, very desirable that stress in the crushing operation should bear longitudinally upon them. To overcome all of these difficulties, I arrange the longitudinal divisional walls eccentrically to the axis of the shaft, K, so that the pockets, $p$, have a positive gathering in motion, which tends to pack or press down, rather than throw out, the constituent materials. If, for example, at the time when the rear wall of one of the pockets is about to pass the point $k$ of the hopper a large piece of stone should intervene, this piece will be either forced whole into the compartments, or if not room there for the whole crushed between the parts $q$ and $k$ and the subdivided portions thrown into the pocket until every space is filled. In short, the position of the arms is such that the tendency is all toward crowding the material into the pockets, bar $k$ and the casing C evening off and expelling the excess material. In experiments incident to the construction of this machine I found where the arms $m$ are arranged radially about the core or axis of the shaft K there was a tendency to throw out instead of crowding in or crushing parts of the material and the pockets frequently came through only partially filled. This inaccuracy in measurement was such as to destroy the utility of a device where nice, accurate and certain measurement is required. To prevent the material from trickling through the machine, I prefer to extend the casing C so that it will cover two or more pockets in the interval between presentation to the feeding mechanism and discharge into the mixing apparatus. Consequently, the material cannot trickle down from one pocket to another, for the simple reason that the lower pocket is already full. On the side intervening between the discharge opening, $h$, and the feed opening, $i$, where the pockets having emptied are again presented for filling the inclination of the arms is such that none of the material can fall through into the mixing apparatus. It will further be observed that the crushing or wearing steel face-plates, $q$, are inclined relative to the arm $m$ in the direction of rotation of the same so as to aid the crowding in of the material and that they also protrude slightly to form a retaining shoulder for the movable transverse plates $o$.

Plates $o$ are made movable and adjustable in the pockets of the roll M. I prefer to accomplish this by providing suitable notches on their sides, so that they will fit snugly between adjacent divisional walls and be retained by the shoulders $s$ and $q$ and locked in position by small wedge-keys $r$ which may be driven into the guides $t$. The keys $r$ may be of any suitable construction, but I prefer to have them taper from one end to the other so as to form a wedge and thus crowd the plates $o$ against the shoulders $s$ as shown in Fig. 4. The plates $o$ are preferably made of pieces of iron or steel. Being close fitting between the walls $m$, these plates by their peculiar shape and position when keyed up tight support and strengthen the walls m at the points of greatest stress during the crowding or crushing operations. A series of plates in all the roll pockets give the united support of all the other walls m to a wall at the moment an intervening stone is crushed by the parts q and k. By withdrawing keys r from the guides t the plates may be moved along to any desired position in the pockets and reset. Each pocket has as many plates as there are partitions B or division walls in the hopper A or other feeding device.

Extending longitudinally below the roll M, in a suitable trough Y, is a combined mixer and conveyer W, mounted on a shaft u extending longitudinally below the measuring-roll journaled in the main frame F and provided with suitable openings for the discharge of the material at the right-hand end. I prefer to mount the first four plates on the left-hand end of the mixer-conveyer, as shown in Fig. 1, on a common hub and the other plates in series or sections of four on common hubs, each hub being keyed to the shaft u. Shaft u is prolonged through its bearings beyond the frame F. At the left-hand end of the mixer-conveyer W, as shown in Fig. 1, the shaft u has a bearing v in the frame. Upon the inside of the frame bearing v has projections, as indicated by v', and mounted upon the shaft at this end of the machine is the enlarged double blade section above mentioned, the outer end of the hub portion of which is chambered to fit the inwardly projecting hub portion v' of the bearing v. Surrounding the shaft and interposed between the projection v' and the hub portion v² of the double section is a hardened or chilled bearing ring v³. A similar ring, v⁴, surrounds the hub portion, v, between the frame and the hub portion v². The purposes of these two rings are to receive the thrust of the stirrers or plates of the mixer-conveyer when in operation, and to minimize the wear, while protecting the bearings from the injurious effects of the materials in the mixer-conveyer-trough. A small water-spray, w, may be provided for moistening the material during the mixing operation.

I prefer to drive the machine from the sprocket D on the shaft u connected to power and to transmit it by train of gears. On shaft u is mounted a gear, E, meshing with gear G on shaft K, which, in turn, meshes with gear H on shaft f. A bucket conveyer or other carrying device adapted to transport the mixed material from the mixer to the point of delivery (not shown) may be provided at the discharge end of the mixer-conveyer-trough and driven by the shaft x and gear J meshing with gear E. By constructing these gears of approximately the relative sizes shown in Fig. 1 agitation, measuring, mixing and delivery may be efficiently and accurately performed at a variety of speeds.

The operation of the above described preferred form of my machine is as follows: The plates o are so adjusted in the pockets p that they form in each as many measuring compartments as there are constituent materials, the relative size of each compartment being the same as the desired relative proportions of the constituent materials. The plates, o, having been set, the hopper, A, is divided into as many compartments as there are constituent materials by inserting partitions B and setting them so that they are in alinement with the corresponding plates o. In this position the partitions are secured by means of the rods e passed through the holes d. Each compartment of the hopper is then supplied with its proper constituent material and the machine is started by applying power through the various trains of gears described. The rotation of the agitators, g, prevents congestion of the material and the measuring compartments in the pockets, p, are presented in succession below the opening i. The peculiar slant or angle at which each pocket is presented first causes the material to drop into the pocket and then gathers, crowds and packs it and finally shears it off between the bars q and k so that the pocket is exactly filled, the parts operating as a positive or force feed. As the pocket is rotated it passes under the casing, C, which covers and holds the filled pockets until final discharge. At the moment one or more of the pockets are filling two other pockets are filled and their contents held or covered by the casing C. As the rotation continues, each full pocket is discharged through the opening h into the mixing apparatus, where rotation of the mixer-conveyer, operated by shaft u, as described, mixes it and delivers it in final shape to the conveyer or other suitable receptacle.

While I have shown in the drawings a machine especially adapted for the measurement and thorough admixture of sand, cement and crushed stone used in the manufacture of concrete, it will readily be seen that the machine is adapted to the compounding of many other compositions containing any number of constituents and that my invention is adapted to the mixing in predetermined quantities of constituent materials generally.

Having thus described my invention, what I claim is:

1. In a measuring and mixing machine, the combination of a hopper having a plurality of adjustable compartments and partitions each adapted to contain and feed a constituent material onto a measuring roll, a measuring roll having longitudinal divisional walls mounted eccentrically to the axis thereof and forming pockets, movable transverse partitions in said pockets, means for adjusting and locking them therein, means for alining the partitions of the hopper with said transverse partitions, mixing apparatus below said roll and a cylindrical casing provided with a top opening into said hopper compartments and a bottom opening into said mixing apparatus, said casing being adapted to fit closely about the outer edges and ends of said longitudinal divisional walls.

2. In a concrete measuring machine, a hopper having a shearing bar on the lower end of its forward wall, a measuring roll having longitudinal divisional walls extending from a point rearward of the axis of rotation to the circumference of said roll, shearing bars on the outer ends of said walls and a casing, extending from the forward wall of said hopper in the direction of delivery, having a curved inner surface adapted to fit closely about the outer ends of said walls, said bars having a shearing engagement with the bar on said hopper wall.

3. The combination of a plurality of compartments adapted to feed material onto a measuring roll, a measuring roll having longitudinal divisional walls inclined in the direction of rotation eccentrically to the axis of the roll and forming pockets therein, a cylindrical casing adapted to fit closely about the outer edges and ends of said longitudinal divisional walls, movable transverse partitions in said pockets, and means for locking said partitions and the walls of said feeding compartments in alinement for the purposes described.

4. In a concrete measuring machine, a hopper having a forward wall rigid at its lower end, a measuring roll having longitudinal divisional walls extending from a point rearward of the axis of rotation to the circumference of said roll, the outer ends of said divisional walls being rigid and having a shearing, packing and crushing engagement with the forward wall of said hopper, and a casing extending from the forward wall of said hopper in the direction of delivery having a curved inner surface substantially coincident with the circumference of said roll.

5. In combination with a hopper having partitions adapted to subdivide it, a roll provided with longitudinal divisional walls mounted eccentrically to its axis, a rigid bar on the lower end of the forward wall of the hopper, bars on the ends of said divisional walls adapted to shear therewith, and transverse partitions adapted to subdivide the spaces between said walls, said hopper partitions and said transverse partitions being substantially in vertical alinement.

6. The combination with a plurality of feed devices and mixing apparatus, of a roll intermediate thereof having longitudinal wings mounted eccentrically to its axis, means for rotating said roll, longitudinal bars on the forward ends of said wings inclined forwardly and a stationary longitudinal bar positioned to shear with the bars of said wings at the point where the latter pass the feed devices.

7. In a mixing and measuring machine, a roll intermediate of feeding and mixing devices having longitudinal divisional walls mounted eccentrically to its axis, adjustable transverse plates adapted to fit snugly between adjacent walls, shoulders on said arms and corresponding notches on said plates, a guide opening in said plates on the end nearest the axis of said roll, and wedge keys adapted to alternately lock and unlock said plates between said walls against said shoulders.

In testimony whereof I hereunto affix my signature in presence of two witnesses.

ANDREW LANQUIST.

Witnesses:
 GEO. M. WILSON,
 ARTHUR GREENE.